3,537,906
PROCESS FOR PRODUCING A FUEL CELL
ELECTRODE
John F. Sindorf, West Allis, Wis., assignor to Allis-
Chalmers Manufacturing Company, Milwaukee, Wis.
No Drawing. Filed Aug. 23, 1966, Ser. No. 574,315
Int. Cl. H01m 13/00
U.S. Cl. 136—120                                        6 Claims

ABSTRACT OF THE DISCLOSURE

A method of forming fuel cell electrodes having a uniform distribution of catalyst particles by dispersing electrically conductive particles in a liquid emulsion of thermoplastic resin to coat the particles with the resin. The coated particles are then precipitated and mixed with an aqueous solution of a surfactant which is vigorously agitated into a foamed mass. The coated particles are then separated from the foamed mass, and formed into a mat of uniformly distributed particles, which is compressed to form a cohesive fuel cell electrode.

---

This invention relates to fuel cells in general, and is particularly concerned with improvements in the production of catalytic electrodes and the improved electrodes obtained thereby which may be suitably employed in the anode and/or cathode in a fuel cell.

The term fuel cell, as used herein, refers to those electrochemical devices that convert the free energy of a chemical reaction directly to electrical energy. Such devices are well known in the art and although there are differences between various cells, a discussion of some of their common characteristics and problems will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant, is supplied by suitable means to the anode, and is thereat electrochemically oxidized. Oxidation of the fuel releases electrons to the anode. At the other electrode called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through the electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, in cells operated at less than about 95° C., a catalyst is necessarily employed to bring the reactants to an activated state. The energy input required to reach an activated state, i.e., heat of activation, partly determines the speed of reaction. Through a mechanistic bypass, a catalyst brings tbout reaction with a smaller heat of activation. To obtain optimum efficiency in fuel cells, it is necessary that the catalyst material be uniformly distributed throughout the electrode surface.

In accordance with the present invention, a fuel cell electrode having uniform distribution of catalyst particles and improved power outputs is prepared by first dispersing electrically conductive particles of which the electrode is to be formed in a liquid emulsion of a thermoplastic resin to form a slurry of the particles and resin. The particles with a discontinuous film of the resin are precipitated from the slurry. The precipitated particles are mixed with an aqueous solution of a surfactant which is agitated vigorously to form a foamed mass. The particles are subsequently separated from the foamed mass by a suitable separation means to form a mat of uniformly distributed particles which are compressed to form a cohesive fuel cell electrode.

In the event the thermoplastic resin selected has sufficient structural strength, particularly where size and compactness is a factor, it may be preferred to form the electrode without any supporting structure other than the thermoplastic resin itself. On the other hand, it is an advantage of the invention that a supporting grid or other base such as a metal mesh or wire screen be applied to the mat of coated electrically conductive particles, if desired, to improve the mechanical strength of the electrode. After application of the support grid to the mat of coated particles, the mat is subjected to pressure exerted to reduce the thickness of the article to the ultimate electrode.

The support grid may be a porous nickel screen, nonwoven screens, perforated metal sheets, metal paper formed of metal fibers and even loosely matted metal fibers may be used.

The relative proportions of thermoplastic resin to the particles employed in the slurry of resin emulsion and particles may vary considerably. With polytetrafluoroethylene from about 1 to about 30 percent by weight of the polytetrafluoroethylene for about each 99 to about 70 percent by weight of electrically conductive particles gives good results, about 15 percent by weight of polytetrafluoroethylene being preferred.

The amount of surfactant employed may vary from about 1 to about 3 percent based on the liquid volume of the mixture.

The electrodes of the present invention may be formed from any electrically conductive particles suitable for use in fuel cells. Materials found to be particularly useful because of their superior fuel cell characteristics include carbon, the metals of Groups I–B, II–B and Groups III–VIII inclusive, of the Periodic Chart of the Elements as well as the rare earth metals and any combination of said electrically conductive materials. Typical examples of metals of which the electrodes of the present invention may be formed include aluminum, copper, nickel, cobalt, iron, silver, gold, palladium, platinum, osmium, iridium, tantalum, titanium, manganese, zirconium and mixtures and alloys thereof.

Surfactants which may be employed in the process of the present invention include nonionic surfactants exemplified by the sorbitan higher fatty acid esters and the polyoxyethylene derivatives thereof, such as are sold under the trademarks "Span" and "Tween," specific examples of which are sorbitan monolaurate and polyoxyethylene sorbitan monostearate; alkyl phenol polyoxyethylene glycol ethers such as are sold under the trademark "Tergitol," exemplified by nonyl and hexadecyl phenol polyoxyethylene glycol ethers; anionic surfactants such as the alkyl aryl polyether sulfonates sold under the trademark "Triton," and exemplified by the sodium salts of alkyl phenyl polyether sulfates; alkyl aryl sulfonates such as are sold under the trademarks "Udet" and "Ultrawet," exemplified by the higher alkylbenbenesulfonates and the lower alkylnaphthalenesulfonates; and cationic surfactants exemplied by the N-higher alkyl quaternary ammonium salts such as are sold under the trademarks "Arquad" and "Sapamine," specific examples of which are n-dodecyl trimethyl ammonium chloride and di-n-octadecyl dimethyl ammonium chloride; ethylene oxide condensation products of the primary fatty amines such as are sold under the trademark "Ethomeen," exemplified by polyoxyethylene higher alkyl tertiary amines; and the like surfactants.

The term "discontinuous" is meant to include a porous coating of thermoplastic to the electrically conductive particles as well as a coating of discrete particles. The film surrounding the electrically conductive particles must be discontinuous, otherwise there would be no metal available as a reaction site. The application of the resin in the form of an emulsion prevents the formation of a continuous film that would bar contact between electrolyte-catalyzed electrode surface and reactant.

Emulsion as that term is used herein, is intended to define both solid in liquid and liquid in liquid emulsions including aqueous dispersions of colloid size particles such as polytetrafluoroethylene (Teflon 41–BX), polychlorotrifluoroethylene and the like. Also suitable are resins which are inert to any destructive chemical action of electrolyte or reactant such as the polyolefins exemplified by polyethylene, polypropylene, and polystyrene. Such resins may either be emulsified finely divided particles in an aqueous dispersion or an aqueous emulsion of the polymer dissolved in a suitable solvent, e.g., polystyrene in benzene, and emulsified with a wetting agent such as an alkyaryl polyether alcohol.

The particles coated with a discontinuous film of the thermoplastic resin are precipitated from the slurry of resin and particles by either vigorous mechanical agitation or by adding a coagulating agent such as monohydroxy alcohols such as methanol and propanol, alkali hydroxides such as potassium and sodium hydroxide, ketones such as methyl ethyl ketone and strong acids such as nitric acid.

After the electrically conductive particles are precipitated from the slurry of dispersed thermoplastic resin and particles, the coated particles are mixed with an aqueous solution of a surfactant and the mixture agitated vigorously until a foam develops which may vary from about 2 to about 4 times the volume of the original liquid phase of the mixture. The foamed admixture is then placed in a suitable filter medium such as a suction filter to separate the liquid phase of the foam and to form a mat of the coated electrically conductive particles. A suitable support screen such as one comprised of nickel or silver is compressed into the mat to form a cohesive plaque. Compression is desirably accomplished by placing the plaque in a ram press and compressing to a desirable thickness.

When the electrode is formed, it is ready for installation in a fuel cell. Often, however, especially with fluorocarbon resins, it is desirable to subject the electrode to a heat cure at a temperature just above the softening point for the resin. With polytetrafluoroethylene resin, the electrode is heated to 675° F. and held at that temperature for 3 to 5 minutes.

The following examples are illustrative of the practice of the invention.

EXAMPLE I

A high surface silver powder produced by the reduction of silver by the rapid and explosive decomposition of a silver carboxylate in accordance with the process described in copending application Ser. No. 422,794, now U.S. Pat. No. 3,377,160 to James E. Schroeder, filed Dec. 31, 1964 was mixed with a previously prepared mixture of 1 part Teflon 41–BX a polytetrafluoroethylene dispersion (containing approximately 35 percent solids having a specific gravity of approximately 1.2) and 1 part water respectively by volume and 5 cc. of a 3:1 aqueous solution of Triton X–100 per 100 cc. of the above diluted Teflon dispersion. Triton X–100 is a trademark for iso-octyl phenoxy polyethoxy ethanol. This admixture of silver, Teflon emulsion, and Triton X–100 surfactant was stirred to bring all the silver particles into contact with the emulsion. To the mixture was added 2-propanol to precipitate the polyetrafluoroethylene. After the polytetrafluoroethylene had precipitated, additional water was added to the mixture with vigourous mixing which caused the mixture to foam.

The foamed admixture was poured into a filter jig and the liquid phase of the foam was removed leaving a mat of the coated metal particles. A nickel support screen was placed on top of the coated silver particle mat. The silver polytetrafluoroethylene mat and screen were subjected to sufficient pressure to form a cohesive plaque. The plaque was then heated in an oven to about 360° C. for about 10 minutes.

The electrode so formed was installed as the cathode in a hydrogen-oxygen fuel cell having a 20–20 platinum-palladium catalyzed porous sintered nickel anode. In the cell, the electrolyte was 30 percent aqueous potassium hydroxide; the cell operating temperature was 90° C.; and the reactant gases were supplied at a pressure of 18 p.s.i.g. The voltage-amperage data obtained for the cell is summarized in Table I below.

TABLE I

| Amperes per sq. foot | Volts |
| --- | --- |
| 40 | 0.989 |
| 80 | 0.962 |
| 120 | 0.934 |
| 160 | 0.908 |
| 200 | 0.884 |
| 240 | 0.860 |
| 280 | 0.838 |
| 320 | 0.818 |

By way of contrast, a silver containing electrode was prepared in an identical manner with the exception that the silver-polytetrafluoroethylene precipitate was not foamed prior to fabrication into an electrode.

The electrode was installed as the cathode in a hydrogen-oxygen fuel cell having a 20–20 platinum-palladium catalyzed porous sintered nickel anode operated at 90° C. The reactant gases were supplied at a pressure of 18 p.s.i.g. The electrolyte was 30 percent aqueous potassium hydroxide. The voltage-amperage data obtained for this comparison cell is summarized in Table II below.

TABLE II

| Amperes per sq. foot | Volts |
| --- | --- |
| 40 | 0.977 |
| 80 | 0.930 |
| 120 | 0.898 |
| 160 | 0.871 |
| 200 | 0.846 |
| 240 | 0.800 |
| 280 | 0.772 |
| 320 | 0.744 |

From a comparison of the voltage-amperage data provided in Tables I and II above, it is readily apparent that the power output of the electrode prepared in accordance with the present invention (Table I) is substantially improved when compared with an electrode prepared in a manner outside the scope of the present invention.

EXAMPLE II

A fuel cell electrode having uniform thickness was made in accordance with the procedure of Example I with the exception that nickel carbonyl particles were substituted for the silver particles used in Example I.

The 5" x 7" nickel plaque fabricated in this manner was compressed to a thickness of about 22 mils. Twenty-four 0.87 inch diameter circles were punched out of this plaque and were weighed and measured for thickness. The average weight of the circles was 0.769 gram. The heaviest circle was found to be 3.72 percent above the average and the lightest circle was 3.63 percent below. All the circles were within 22±1 mils.

The embodiments of the invention in which an exclusive property or privilege is claimed are defined as follows:

1. A process for producing a fuel cell electrode comprising the steps of:
    (a) forming a slurry by admixing electrically conductive particles with an aqueous emulsion of a thermoplastic resin to form a liquid resin dispersion;
    (b) mixing said slurry for a time sufficient to insure contact of all said electrically conductive particles with said resin dispersion to coat said electrically conductive particles with a discontinuous film of said thermoplastic resin;
    (c) precipitating said electrically conductive particles coated with said discontinuous film of said thermoplastic resin from said slurry;
    (d) forming a mixture of the precipitated said coated electrically conductive particles and an aqueous solution of a surfactant;
    (e) vigorously agitating said mixture to form a foamed mass;
    (f) separating said coated electrically conductive particles from said foamed mass;
    (g) forming a mat of uniformly distributed said coated electrically conductive particles; and
    (h) compressing said mat of said coated electrically conductive particles into a cohesive mass to form a fuel cell electrode.

2. The process of claim 1 wherein said electrically conductive particles are catalytic for the fuel cell reaction.

3. The process of claim 1 wherein said electrically conductive particles are silver.

4. The process of claim 1 wherein said electrically conductive particles are nickel.

5. The process of claim 1 wherein the themoplastic resin is polytetrafluoroethylene.

6. The process of claim 1 wherein the surfactant is iso-octyl phenoxy polyethoxy ethanol.

References Cited
UNITED STATES PATENTS

| | | | |
|---|---|---|---|
| 3,305,400 | 2/1967 | Barber et al. | 136—120 |
| 3,328,203 | 6/1967 | Jeannin et al. | 136—29 |
| 3,377,160 | 4/1968 | Schroeder | 75—118 |

WINSTON A. DOUGLAS, Primary Examiner

O. F. CRUTCHFIELD, Assistant Examiner